J. C. WISE.

AGITATING SULFUR BURNER.

APPLICATION FILED JUNE 25, 1908.

Reissued Feb. 16, 1909. 12,921.

3 SHEETS—SHEET 1.

Witnesses

J. Smith

H. B. Allard.

Inventor

Jennings C. Wise.

By Stewart & Stewart

Attorney

J. C. WISE.

AGITATING SULFUR BURNER.

APPLICATION FILED JUNE 25, 1908.

Reissued Feb. 16, 1909.

12,921.

3 SHEETS—SHEET 2.

Witnesses

F. E. Ballard

Jennings C. Wise.

By Stewart & Stewart

Attorneys

J. C. WISE.

AGITATING SULFUR BURNER.

APPLICATION FILED JUNE 25, 1908.

Reissued Feb. 16, 1909. 12,921.

3 SHEETS—SHEET 3.

Witnesses

J. E. Ballard

Inventor

Jennings C. Wise

By Stewart & Stewart

Attorneys

UNITED STATES PATENT OFFICE.

JENNINGS CROPPER WISE, OF WATERTOWN, NEW YORK.

AGITATING SULFUR-BURNER.

No. 12,921. Specification of Reissued Letters Patent. Reissued Feb. 16, 1909.

Original No. 835,926, dated November 13, 1906, Serial No. 316,531. Application for reissue filed June 25, 1908. Serial No. 440,398.

*To all whom it may concern:*

Be it known that I, JENNINGS CROPPER WISE, a citizen of the United States, and a resident of Watertown, in the county of Jefferson and State of New York, have invented a new and improved Agitating Sulfur-Burner, of which the following is a full, clear, and exact description.

My invention relates to sulfur-burners, and mainly to increasing the general efficiency of the same.

Among the several objects of my invention are the following: first, a comparatively large capacity for a given area occupied by the burner; second, the production of a richer and more uniform gas; third, perfect combustion of the sulfur known upon the market as "Louisiana" sulfur; fourth, a saving of labor, due to the fact that the movement of the sulfur into the pot is to some extent automatic; fifth, ease of regulation of the admission of air, and, sixth, uniformity of admission of air into different parts of the burner. I accomplish these results by certain mechanism shown in the accompanying drawings, described below, and pointed out in the appended claims.

Reference is to be had to the accompanying drawings, forming a part of this specification, in which similar characters of reference indicate corresponding parts in all the figures.

Figure 1:
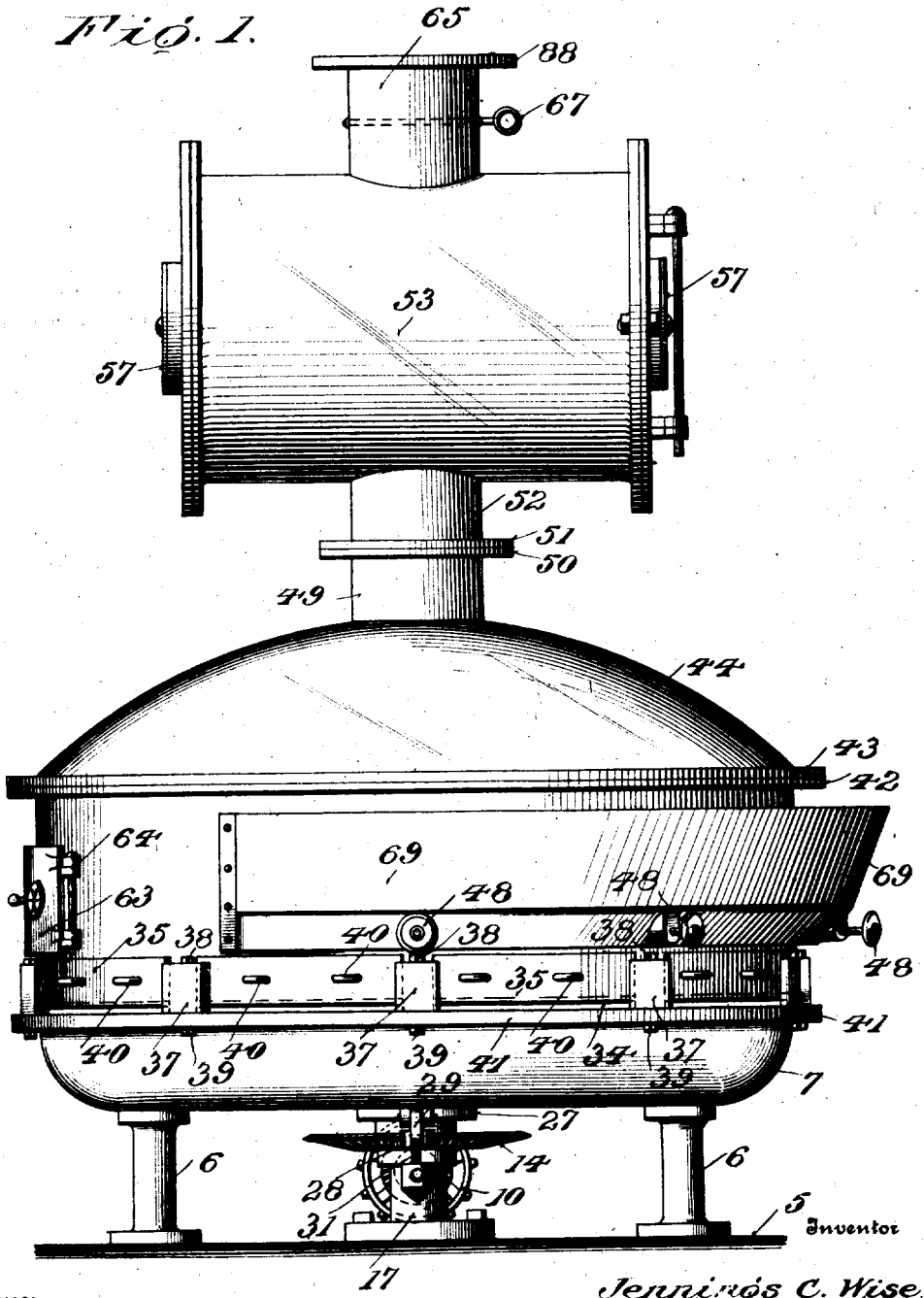
Figure 2:
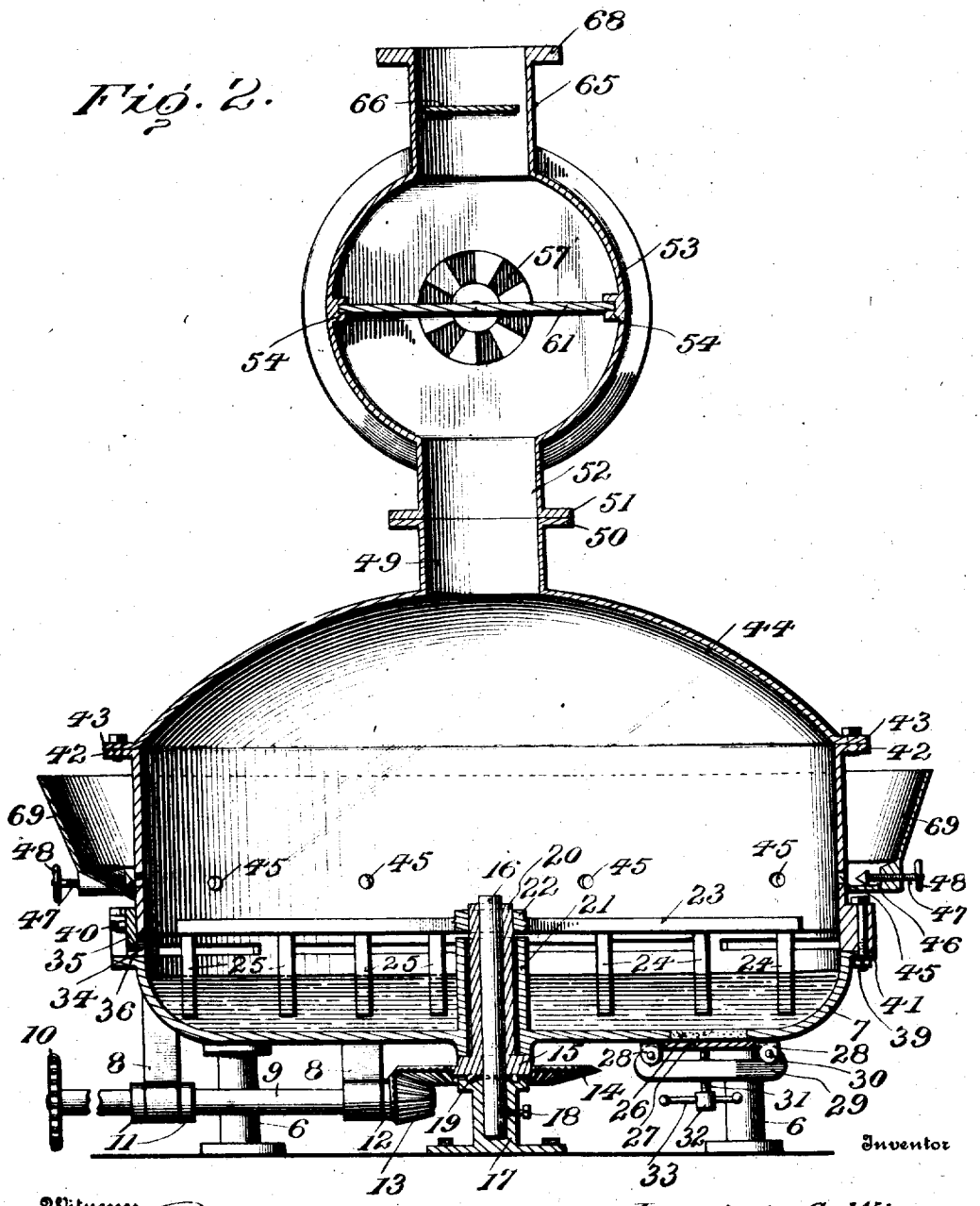
Figure 3:
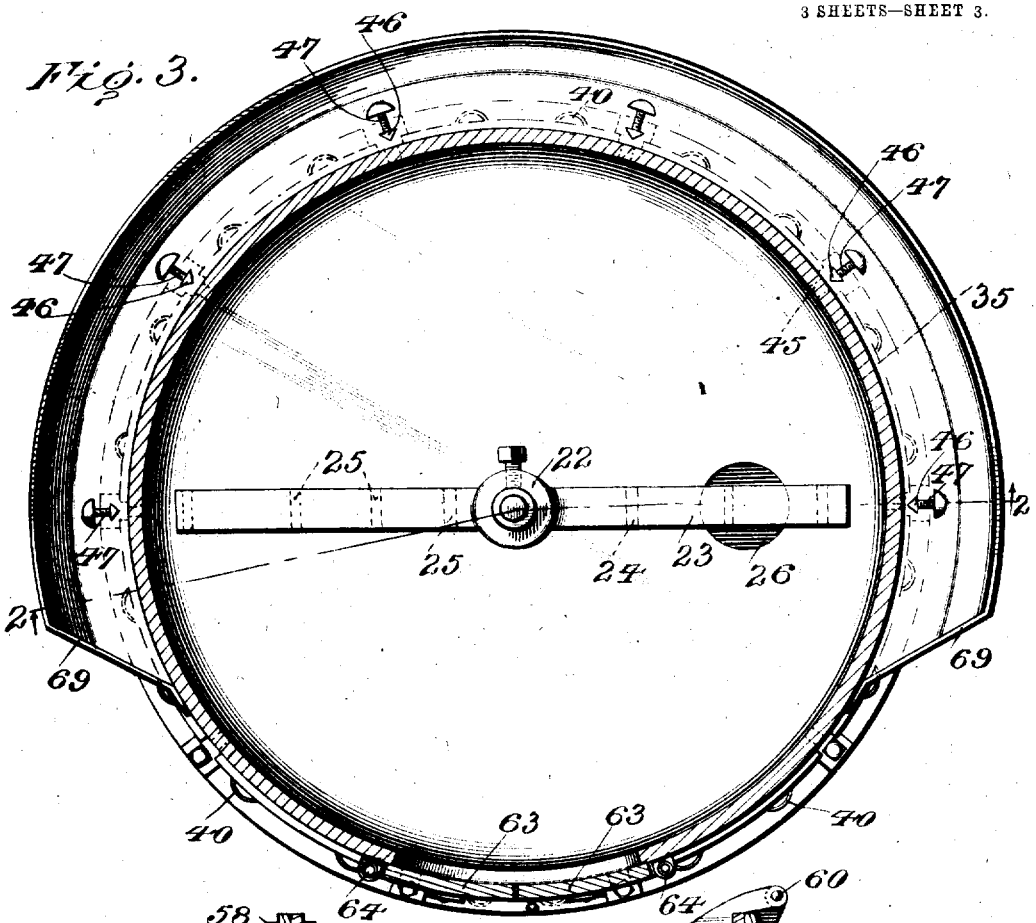
Figure 4:
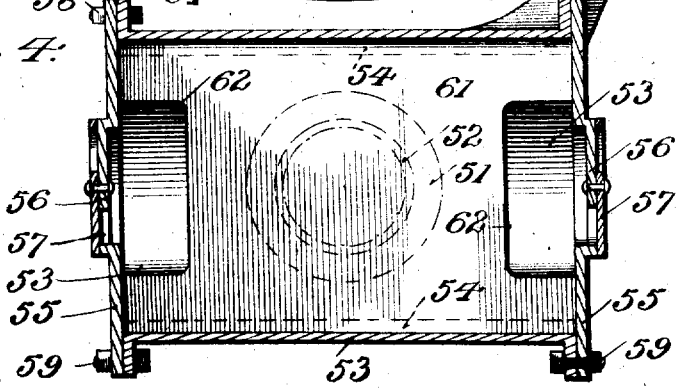

Figure 1 is a side elevation of my burner complete, including the driving mechanism, feed-hopper, air-admission device, and combustion-box. Fig. 2 is a vertical section taken upon the line 2 2 of Fig. 3 looking in the direction of the arrow and showing the revoluble stirrer, the feed-hopper, the hand-valves for regulating the feed of sulfur therefrom, and the internal mechanism of the combustion-box. Fig. 3 is a horizontal section through the pot, showing in plan the revoluble stirrer and the feed-hopper; and Fig. 4 is a horizontal section through the combustion-box, showing the baffle-plate 61 and its apertures 62.

Upon a surface 5 rest pedestals 6, supporting a pot 7, the general form of which is circular. Depending from this pot 7 are hangers 8, which support a rotatable shaft 9, the outer end of which is provided with a sprocket wheel 10, suitable for a chain-drive, whereby the shaft is rotated. Collars 11 12 maintain the shaft in proper working relation to the hangers 8. A bevel-pinion 13 is mounted rigidly upon the inner end of the shaft 9 and rotates therewith. A bevel-gear 14 meshes with the bevel-pinion 13 and is provided with a shoulder 15, which encircles a stem 16. The latter is preferably of steel and is mounted within a pedestal 17, being secured rigidly therein by a set-screw 18. The upper end of the pedestal 17 terminates in a ball-bearing 19, which engages the lower center portion of the shoulder 15, so that the bevel-gear 14 virtually turns upon the ball-bearing. Integral with the bevel-gear 14 and shoulder 15 is a barrel 20, which encircles the stem 16 and is free to turn thereupon. Integral with the pot 7 and encircling the barrel 20 is a bearing-sleeve 21, which projects upwardly. An annular head 22 is secured rigidly to the upper end of the barrel 20 and is provided with arms 23, extending in opposite directions. These arms are provided, respectively, with teeth 24 25, disposed at equal distances from the center represented by the stem 16, the tooth 24 being so disposed relatively to the tooth 25 as to sweep through different paths—that is to say, a tooth 25 does not follow the same path as a tooth 24. The purpose of this arrangement is to render the stirring more thorough.

The pot 7 is provided with a circular aperture 26, normally closed by a circular door 27. Disposed upon opposite sides of this door are lugs 28, supporting a link 29 and connected therewith by means of pins 30. A screw 31 passes vertically through the link 29 and is provided with a head 32, through which passes a hand-lever 33. This arrangement is quite analogous to that employed upon a copying-press. By turning the hand-lever 33 the screw 31 is caused to rotate, and the plate 27 is forced against the under side of the pot 7 or is released therefrom, according to the direction of rotation of the screw. When the screw is so turned as to lower the plate 27, the latter rests upon the upper side of the link 29. The arrangement just described is for the purpose of enabling residual substances and impurities to pass from the pot. The stirrers being constantly at work and the sulfur being gradually burned out, all residual substances gradually assume the form of a powder and find lodgment within the aperture 26, so as to rest upon the plate 27.

This plate being lowered, as above described, the powder may be removed—as, for instance, by inserting a rake or hoe beneath the pot 7, so as to scrape the upper surface of the plate 27. The pot 7 is further provided with horizontally-disposed slots 34, and adjacent to each slot is a movable gate 35, which fits in slideways 36 in vertically-disposed lugs 37. Threaded through each of these lugs for the purpose of holding it in position is a bolt 38, having upon its lower end a revoluble nut 39. The lugs 37 may be removed by merely loosening the nuts 39 and taking out the bolts 38. Each gate 35 is provided with handles 40, whereby it may be raised or lowered, and the gate fits into its slideways with such a degree of tightness that the operator by merely pushing it up or down regulates the virtual capacity or size of the corresponding slot 34.

A flange 41 serves as a limiting-stop for the gates 35. If the slots 34 are to be entirely closed, the gates 35 are merely pushed down into engagement with the flange 41. Another flange 42 is located some distance above the flange 41, and engaging the flange 42 is a flange 43, which is integral with a dome 44.

A number of feed-holes through the pot are shown at 45 and are spaced equidistant. Adjacent to each of these feed-holes is a conical valve 46, mounted rigidly upon the end of a revoluble screw 47, provided at its outer end with a hand-wheel 48. By turning the hand-wheel 48 the conical valve 46 is brought partially into the corresponding feed-hole 45 and may be made to close the same to any desired extent. In order, therefore to regulate the capacity of the feed-holes, all that is necessary is to turn the hand-wheel 48.

The dome 44 is provided with a neck 49, terminating in a flange 50, which engages a flange 51 of another neck 52. Mounted upon the neck last mentioned is a combustion-box 53. The latter is of cylindrical shape and is provided with slideways 54. The ends of the combustion-box 53 are disks or heads 55, each being provided with a spider 56, supporting a revoluble damper 57. By turning this damper the interior of the combustion-box may to a greater or lesser extent be brought into communication with the outer atmosphere. Bolts 58 59 secure one of the heads 55 in position. The other head is mounted upon a hinge 60 and bolts 59. By removing the latter this head (represented at the right of Fig. 4) may be swung open.

Mounted in slideways 54 and inclosed by the combustion-box 53 is a baffle-plate 61, provided at its opposite ends with apertures 62, as will be understood from Fig. 4. This baffle-plate may be removed by sliding it out endwise, one or the other of the heads 55, preferably the one shown at the right of Fig. 4, being first moved out of the way.

Doors 63, mounted upon hinges 64, are employed for the purpose of giving access to the interior of the apparatus. Superposed above the combustion-box 53 is a neck 65, and adjustably mounted within this neck is a damper 66, supported by a stem 67. By turning the latter by hand the damper 66 may be tilted to any desired angle, and thus caused to check the outflow of gas from the burner. The neck 65 terminates in a flange 68 for enabling the apparatus to be connected with a cooler of the style commonly used in this art. A hopper is shown at 69 and is used for supplying sulfur to the pot.

The operation of my device is as follows: Sulfur of almost any kind—for instance, the so-called "Louisiana" sulfur—is placed within the hopper 69 and is melted by heat from the interior of the pot, as hereinafter described. The molten sulfur seeks to find its way through the feed-holes 45, and the capacity of these holes, as above explained, is regulated by turning the hand-wheel 48 into appropriate position. The sulfur is thus gradually fed down into the pot, where it appears as a liquid. Power being now applied to the sprocket-wheel 10, the stirrer 23 is rotated and the teeth 24 25 pass circularly around the bearing-sleeve 21. As each tooth describes a path independent of the other path the stirring is rendered thorough. After a long use any residual powder which may accumulate in the pot is removed through the aperture 26, as above described. The sulfur within the pot is ignited and tends to burn after the manner of other combustibles. The supply of air through the slots 34 is regulated to a nicety by adjusting the positions of the several gates 35. The exact position to be occupied by these gates in order to supply a proper amount of air is somewhat arbitrary, depending upon the quality of the sulfur, the general temperature of the air where the apparatus is being used, the size of the apparatus, the force exerted by the suction-pump in drawing gases out of the apparatus, and many other factors. The quantity of air supplied to the burning sulfur is such as to form sulfur dioxid, ($SO_2$) which is employed in making sulfite liquor. As the gas passes upward in the combustion-box 53 it encounters the baffle-plate 61 and is forced to divide so as to pass through the two apertures 62, as will be understood from Fig. 4. The two portions of gas thus separated immediately recombine in the upper part of the combustion-chamber. The dampers 57 if turned to a proper angle admit sufficient air to prevent sublimation. I find that in some instances it is desirable to admit a supply of air directly into the combustion-box independently of the supply of air through the slots 34. It is upon this account that I employ the two dampers 57. By turning these dampers to any desired extent a corresponding amount of air is caused to enter through the heads of the combustion-box. This auxiliary admission of air is desirable when for any reason difficulty is encountered in causing thorough combustion within the pot, and consequently there is a tendency for the unburned sulfur vapors or sublimed portions of the sulfur to pass off in elementary form. I find that if air be admitted through the heads of the combustion-box, as above described, it will cause any unburned sulfur vapors or sublimated portions of sulfur to burn and form $SO_2$, provided the aeriform portions just mentioned have sufficient heat. It should be borne in mind that notwithstanding the endosmotic proportion of gases and vapors it may sometimes happen, especially in a rapidly-working apparatus, that some portion of sulfur vapor does not happen to be brought into contact with a proportionate quantity of air, and while possessing sufficient heat to support combustion is prevented from being consumed upon this account. In such instance the auxiliary air inlets are useful. The dampers and baffle-plates are essential to thorough combustion.

I desire to lay emphasis upon the fact that the general form of the pot is circular and that the slots 34 are therefore arranged in the form of a circle and are equidistant from the center of the pot. By this arrangement the several distinct volumes of air passing inward radially through the different slots toward the center of the burner must travel equal distances and are therefore exposed to like conditions. The tendency, therefore, is to produce uniformity in the conditions existing throughout the pot and to promote the uniform combustion of the sulfur vapor as far as practicable. I have found from actual trial that the circular form given to the pot increases the general efficiency of the apparatus to a degree which is astonishing. The better results are, no doubt, attributable to the fact that perfect burning of the sulfur is obtained because of the equality of the several drafts taking place in different directions. Moreover, because of the fact that the several drafts converge toward the center of the pot the admixture of the air and gas is rendered more thorough than would be the case if a cube-shaped pot were employed.

The substance of my invention may be said to lie in the fact that I employ a furnace provided with suitable ports evenly distributed immediately above the level of the fluid contained within the furnace, said ports being provided with means to adjust the size thereof, and thus control the supply of air or gas to the point of combustion, said retort also being provided with an exhaust port. By this means I may regulate with certainty the elements of combustion which I desire to combine within the retort. I also provid convenient and economical means for delivering the sulfur or equivalent substance to the retort at suitable points, such means being adjustable to control said supply. Together with means to agitate the material in the retort during combustion.

As a further means looking to the more perfect combustion and appropriate union of the elements of combustion, I provide a combustion chamber adapted to receive the gases exhausted from the retort, and cause the same to be further mixed with air or other elements of combustion to the end that perfect combustion is accomplished. This combustion chamber is provided with a suitable baffle plate or plates to direct the flow of the gases coming from the retort, as well as suitable parts provided with adjustable means to control the flow of air or gas into the combustion chamber. The baffle plates and combustion chamber become sufficiently heated to sustain the gases at or above the temperature of combustion, hence, any of the elements of combustion exhausted from the retort which are not suitably melted, absorbed or united to accomplish my purpose are here again supplied with air or gas in suitable quantities adapted to work such combustion in the presence of heat derived from the gases coming from the retort and also by radiation from the baffle plates and walls of the combustion chamber.

Thus it will be seen that my apparatus is completely adjustable as regards the supply to the same of all the elements of combustion, and is divided into two parts or sections, that is to say, a primary retort or burner in which the first combustion is accomplished, and a secondary furnace or combustion chamber in which a secondary and final combustion takes place, and from which the completed product is exhausted.

I am aware that all of the elements which go to make up my apparatus are in themselves old and well understood in the art save only in the manner in which I have brought them together and caused them to co-act in the accomplishment of the end which I have in view. That is to say, the complete union of gases in regulatable quantities or qualities according to a predetermined ratio.

I am unable to define or differentiate, with certainty, the various operations which take place in my apparatus nor do I feel called on to do more than state their functions, suffice it that I know the device to be new and useful, and well adapted for the purpose for which it is intended. I may, however, for the sake of precision state some of those features of the device which might not be obvious to one unacquainted with its operation. In the burning of sulfur the supply of sulfur is economically heated to the point of fluidity by the combustion of sulfur within the retort and flows under suitable control into the retort. The air is delivered to the retort in regulatable quantities and from points where it is best adapted to combine with the contained gases. The agitation of the sulfur promotes combustion and this again is regulatable. Under perfect conditions of regulation, these elements might produce the perfect result, but in practice I find that perfect combustion and union of the elements is not always accomplished in the primary stage, I therefore provide a secondary means and exhaust the product through the combustion chamber described; this in practice becomes heated to a high temperature as the gases pass through the same, and here again I supply air or its equivalent in regulatable quantities and mechanically force the gas and air together in the presence of heat radial and otherwise to a degree calculated to promote combustion and eventually exhaust the product from this chamber, at the same time controlling such exhaust. Thus it will be seen that the whole apparatus is adjustable to the end that any desired result may be accomplished dependent on the elements of combustion supplied and the manner in which the combustion is controlled. In practice, I find that given certain fixed elements of combustion, and under uniform conditions of external temperature, when once the apparatus is set it will produce uniform results.

Where in my claims I use the expression with reference to the parts in the retort, that they are "uniformly disposed" I intend to convey that these parts are so disposed as to deliver the air through the same uniformly to the interior of the retort, so that the air is delivered into the retort in a direction substantially toward its center, or in other words, to deliver the air uniformly to all parts of the fluid within the retort.

The machine above described may be employed for many purposes other than that described. I therefore do not limit myself to any particular service to which it may be applied; neither do I limit myself to the particular mechanism shown.

Having thus described my invention, I claim as new and desire to secure by Letters Patent—

1. The combination of a vessel provided with feed holes, manually-operated valves for limiting the capacity of said feed-holes, a hopper for supplying melted sulfur through said feed-holes, mechanism mounted within said vessel for agitating said sulfur as the same is burned therein, and means for removing gases formed by combustion of said sulfur.

2. In a sulfur-burner, the combination of a vessel for containing burning sulfur, a combustion-chamber in connection with said vessel and provided with slideways, a baffle-plate mounted within said slideways and provided at its opposite edges with apertures, and means for regulating the flow of the gases of combustion around said baffle-plate.

3. In a sulfur-burner, the combination of a vessel for containing burning sulfur, a combustion-box communicating with said vessel, a baffle-plate mounted within said combustion-box, a passage for the gases around the baffle-plate, and means for admitting air immediately above and immediately below said baffle-plate.

4. In a sulfur-burner, the combination of a vessel provided with an aperture for containing burning sulfur, means for agitating said burning sulfur, means for forcing into said aperture residual substances liberated by the combustion of said sulfur, a plate for closing said aperture, and means controllable at will for removing said plate in order to dislodge said residual substances.

5. In a sulfur-burner, the combination of a vessel for containing burning sulfur, said vessel being provided with an aperture, means for agitating said burning sulfur within said vessel so as to liberate therefrom residual substances and to force the latter into said aperture, a plate for normally closing said aperture, and a hand-operated screw for holding the said plate against said aperture.

6. In a sulfur-burner, the combination of a pot provided with a central bearing-sleeve, a stirrer mounted within said pot and revoluble in relation thereto, mechanism connected with said stirrer for turning the same, and a hopper concentric to said pot for supplying sulfur thereinto.

7. The combination of a containing vessel for burning sulfur, a hopper partially encircling said containing vessel and disposed concentric thereto, means for feeding sulfur from said hopper into said containing vessel, and mechanism for conducting away the gases of combustion of said sulfur.

8. The combination of a containing vessel for burning sulfur, a hopper partially encircling said containing vessel and concentric thereto for supplying sulfur thereinto, said hopper being immediately adjacent to said containing vessel so that said sulfur within said hopper may be melted by heat from said containing vessel, and means for regulating the supply of sulfur from said hopper into said containing vessel.

9. In a sulfur-burner, the combination of a circular vessel for containing burning sulfur, a hopper partially encircling said vessel and adapted to hold melted sulfur, and mechanism for controlling the flow of said sulfur from said hopper into said vessel.

10. The combination of a containing vessel, a hopper partially encircling the same, means for controlling a flow of sulfur from said hopper to said containing vessel, a plurality of gates disposed below said hopper and adapted to admit a supply of air radially toward the center of said containing vessel, a stirrer mounted within said containing vessel, and means for actuating said stirrer.

11. The combination of a receptacle for burning sulfur, a combustion-chamber communicating with said vessel, a baffle-plate slidably mounted within said combustion-chamber and provided with apertures, and a closure member mounted upon said combustion-chamber at a point adjacent to said baffle-plate.

12. In a gas producing furnace and apparatus, a furnace provided with air inlets disposed above the level of the material to be contained within the furnace and at points around the furnace to substantially embrace the area presented by the upper surface of such material whereby substantially all points of the surface of the material may be exposed to the air, means to adjust the capacity of the air inlets, a secondary combustion chamber, a gas connection from a point of the furnace over the material therein to the interior of the secondary combustion chamber.

13. In a gas producing furnace and apparatus, a stationary furnace provided with air inlets disposed above the level of the material to be contained within the furnace and at points around the furnace to substantially embrace the area presented by the upper surface of such material whereby substantially all points of the surface of the material may be exposed to the air, means to adjust the capacity of the air inlets and means within the furnace for agitating the material therein contained.

14. In a gas producing furnace and apparatus, a stationary furnace provided with air inlets disposed above the level of the material to be contained within the furnace, means to adjust the capacity of such air inlets, means to agitate the material within the furnace, and means to feed said material in a fluid condition to the furnace, such feeding means being adjustable.

15. In a gas producing furnace and apparatus, a furnace provided with air inlets above the level of the material to be contained therein and disposed at points around the furnace to substantially embrace the area presented by the upper surface of the material whereby all points of the surface of the material may be exposed to the air, means for adjusting the capacity of said air inlets, an exhaust port in the furnace, a gas combustion chamber in communication with said exhaust port, said combustion chamber having a plurality of air inlets and an exhaust port, means for regulating the capacity of the air inlets of the combustion chamber, and means within the combustion chamber for directing gases in a circuitous path through the combustion chamber.

16. In a gas producing furnace and apparatus, a furnace provided with air inlets above the level of the material to be contained therein, means for adjusting the capacity of the air inlets, an exhaust port from the furnace, means within the furnace to agitate the material therein contained, a gas combustion chamber in communication with the exhaust port of the furnace, said combustion chamber having air inlets and an exhaust port, and means for directing the gases in a circuitous path through the combustion chamber.

17. In a gas producing furnace and apparatus, a furnace provided with air inlets above the level of the material to be contained therein, means for adjusting the capacity of the air inlets, an exhaust port from said furnace, means within the furnace to agitate the material therein contained, means for feeding fluid material to the furnace to be burned therein, means for regulating the feed of the fluid material, a gas combustion chamber in communication with the exhaust port of the furnace, said combustion chamber having air inlets and an exhaust, means for regulating the capacity of the air inlets to the combustion chamber, and means for directing the flow of gases in a circuitous path through the combustion chamber.

18. In a gas producing furnace and apparatus, a furnace provided with air inlets above the level of the material to be contained therein, means for adjusting the capacity of the air inlets, an exhaust port from the furnace, means for agitating the material within the furnace, a hopper without the furnace, passages from the interior of the hopper to the exterior of the furnace for the feed of material into the latter, adjustable valves in said passages for regulating the feed, a gas combustion chamber in communication with the exhaust port of the furnace, said combustion chamber having an exhaust port and air inlets, means for regulating the capacity of the air inlets in the combustion chamber and means for directing the flow of gases in a circuitous path through the combustion chamber.

19. In a gas producing furnace and apparatus, a stationary furnace provided with air inlets above the level of the material to be contained therein, means for adjusting the capacity of the air inlets, an exhaust port from the furnace, a combustion chamber above the furnace in communication with the furnace exhaust port, an exhaust port from the combustion chamber, air inlets to the combustion chamber, and means for regulating the capacity of the air inlets in the combustion chamber.

20. In a gas producing furnace and apparatus, a stationary furnace provided with air inlets above the level of the material to be contained therein, means for adjusting the capacity of the inlets, an exhaust port from the furnace, means for feeding fluid material to the furnace, means for regulating the feed of such material, a combustion chamber mounted above the furnace and in communication with the furnace exhaust, an exhaust from the combustion chamber, air inlets in the combustion chamber, means for regulating the capacity of the air inlets, and means for directing the flow of gases in a circuitous path through the combustion chamber.

21. In a gas producing furnace and apparatus, a stationary furnace provided with air inlets above the level of the material to be contained therein, means for adjusting the capacity of the inlets, an exhaust port from the furnace, means for feeding fluid material to the furnace, means for regulating the feed of such material, a combustion chamber mounted above the furnace and in communication with the furnace exhaust, an exhaust from the combustion chamber, air inlets in the combustion chamber, means for regulating the capacity of the air inlets, means for directing the flow of gases in a circuitous path through the combustion chamber, and means for adjusting the capacity of the exhaust in the combustion chamber.

22. In a gas producing furnace and apparatus, a furnace, a receptacle for material, said receptacle being so positioned with respect to the furnace that the material therein may be melted by the heat radiated by the furnace, a passage by means of which the interior of the receptacle is in communication with the interior of the furnace to permit the material to pass from the receptacle to the furnace, an air inlet to the furnace, a secondary combustion chamber and a communicating passage from the interior of the furnace to the interior of the secondary combustion chamber, said communicating passage and secondary combustion chamber being removed from the receptacle containing the raw material whereby the latter may not cool the gases in the combustion chamber and passage thereto, an air inlet to the secondary combustion chamber and a gas outlet therefrom.

23. In a gas producing furnace and apparatus, a furnace, a receptacle for material, said receptacle being so positioned with respect to the furnace that the material therein may be melted by the heat radiated by the furnace, a passage by means of which the interior of the receptacle is in communication with the interior of the furnace to permit the material to pass from the receptacle to the furnace, an air inlet to the furnace, a secondary combustion chamber and a communicating passage from the interior of the furnace to the interior of the secondary combustion chamber, said communicating passage and secondary combustion chamber being removed from the receptacle containing the raw material whereby the latter may not cool the gases in the combustion chamber and passage thereto, an air inlet to the secondary combustion chamber and a gas outlet therefrom.

24. In a gas producing furnace and apparatus, a stationary furnace, a receptacle for material, said receptacle being so positioned with respect to the furnace that the material therein may be melted by the heat radiated by the furnace, a passage by means of which the interior of the receptacle is in communication with the interior of the furnace to permit the material to pass from the receptacle to the furnace, an air inlet to the furnace, a secondary combustion chamber and a communicating passage from the interior of the furnace to the interior of the secondary combustion chamber, said communicating passage and secondary combustion chamber being removed from the receptacle containing the raw material whereby the latter may not cool the gases in the combustion chamber and passage thereto, an air inlet to the secondary combustion chamber and a gas outlet therefrom.

25. In a gas producing furnace and apparatus, a stationary furnace, a receptacle for material, said receptacle being so positioned with respect to the furnace that the material therein may be melted by the heat radiated by the furnace, a passage by means of which the interior of the receptacle is in communication with the interior of the furnace to permit the material to pass from the receptacle to the furnace, an air inlet to the furnace, means within the furnace for agitating the heated material therein, a secondary combustion chamber and a communicating passage from the interior of the furnace to the interior of the secondary combustion chamber, said communicating passage and secondary combustion chamber being removed from the receptacle containing the raw material whereby the latter may not cool the gases in the combustion chamber and passage thereto, an air inlet to the secondary combustion chamber and a gas outlet therefrom.

26. In a gas producing furnace and apparatus, a furnace, a receptacle for material, a passage by means of which the interior of the receptacle is in communication with the interior of the furnace to permit the material to pass from the receptacle to the furnace, an air inlet to the furnace, a secondary combustion chamber and a communicating passage from the interior of the furnace to the interior of the secondary combustion chamber, said communicating passage and secondary combustion chamber being removed from the receptacle containing the raw material whereby the latter may not cool the gases in the combustion chamber and passage thereto, an air inlet to the secondary combustion chamber and a gas outlet therefrom.

27. In a gas producing furnace and apparatus, a furnace and means for supplying material thereto, an air inlet to the furnace above the level of the material therein, a secondary combustion chamber, a passage for the gases from the furnace to the secondary combustion chamber, means for supplying air to the secondary chamber to produce therein a secondary combustion, and a plate or surface in the secondary combustion chamber disposed transversely of the axis of the gas inlet to the chamber so that the gases as they enter the chamber are projected against the surface, whereby, because of the high temperature of said surface due to the secondary combustion of the preceding gases, the temperature of the incoming gases is raised preparatory to combustion.

28. In a gas producing furnace and apparatus, a furnace and means for supplying material thereto, an air inlet to the furnace, a secondary combustion chamber, a passage for the gases from the furnace to the secondary combustion chamber, means within the secondary chamber for dividing therein the incoming current of gases into a plurality of streams, means for supplying a current of air to each stream of said gas current, and a gas outlet from the chamber.

29. In a gas producing furnace and apparatus, a furnace and means for supplying material thereto, an air inlet to the furnace, a secondary combustion chamber, a passage for the gases from the furnace to the secondary combustion chamber, a heating surface within the secondary chamber for heating and dividing therein the incoming current of gases into a plurality of streams, means for supplying a current of air to each stream of said gas current, and a gas outlet from the chamber.

30. In a gas producing furnace and apparatus, a furnace and means for supplying material thereto, an air inlet to the furnace, a secondary combustion chamber, a passage for the gases from a point of the furnace over the material therein to the secondary combustion chamber, means within the secondary chamber for dividing therein the incoming current of gases into a plurality of streams, and an air inlet to each of the several streams in the chamber and a gas outlet from the chamber.

31. In a gas producing furnace and apparatus, a furnace and means for supplying material thereto, an air inlet to the furnace, a secondary combustion chamber, a passage for the gases from a point of the furnace over the material therein to the secondary combustion chamber, means within the secondary chamber for dividing therein the incoming current of gases into a plurality of streams, an air inlet to each of the several streams the chamber and a gas outlet from the chamber, and means for regulating the air supply through the air inlet.

32. In a gas producing furnace and apparatus, a furnace and means for supplying material thereto, an air inlet to the furnace, a secondary combustion chamber, a passage for the gases from the furnace to the secondary combustion chamber, means within the secondary chamber for dividing therein the incoming current of gases into a plurality of streams, means for supplying a current of air to each stream of said gas current, a gas outlet from the chamber, and means for regulating the air supply to the several gas currents.

In testimony whereof I have signed my name to this specification in the presence of two subscribing witnesses.

JENNINGS CROPPER WISE.

Witnesses:

W. L. MAUPIN,

C. W. ALLEN.